United States Patent [19]

Shepherd

[11] 4,197,355

[45] Apr. 8, 1980

[54] LACQUER FOR REFURBISHING MOLDED PLASTIC BODIES

[75] Inventor: Lloyd Shepherd, Madison, N.J.

[73] Assignee: Bell Telephone Laboratories, Incorporated, Murray Hill, N.J.

[21] Appl. No.: 952,093

[22] Filed: Oct. 17, 1978

[51] Int. Cl.$^2$ .......................... B05D 3/02; B32B 27/00; C08K 5/07; C08K 5/10

[52] U.S. Cl. .............................. 428/520; 260/32.8 N; 260/32.8 A; 260/31.4 R; 427/393.5; 428/522; 428/523

[58] Field of Search .............. 427/385 B; 260/32.8 N, 260/32.8 A, 31.4 R; 428/500, 520, 522, 523

[56] References Cited

U.S. PATENT DOCUMENTS 3,917,554 11/1975 Inoue et al. ..................... 260/32.8 X 3,940,361 2/1976 Sommerfeld .................... 260/31.4 X

*Primary Examiner*—Michael R. Lusignan

*Attorney, Agent, or Firm*—Bruce S. Schneider

[57] ABSTRACT

Smooth, glossy lacquered surfaces are obtained by coating an ABS (acrylonitrile-butadiene-styrene terpolymer) plastic with a lacquer based on a solvent system with a ketone such as methyl ethyl ketone and a second solvent constituent such as ethylene glycol monoethyl ether acetate and which has a solids content substantially of ABS plastic. The lacquer is easy to spray and provides adequate hiding power. The ABS specimens sprayed with the lacquer retain the impact resistant properties usually associated with this plastic. Additionally, the plastic obtained by recycling these lacquer coated ABS bodies retains the impact resistance of ABS.

13 Claims, No Drawings

LACQUER FOR REFURBISHING MOLDED PLASTIC BODIES

BACKGROUND OF THE INVENTION

1. Field of the Invention

This invention relates to lacquers and more particularly to lacquers useful for coating plastic surfaces.

2. Art Background

The refurbishing of telephones is a significant problem for communication companies. When a telephone is returned from a user location scratches and other surface defects are present. Typically, before these marred telephones can be relocated with a new user, the defects must be eliminated. In this case, the surface defects are remedied by spraying the telephone with a lacquer. The polymer used in the lacquer and which ultimately forms the coating on the telephone significantly affects the physical properties of the telephone. For example, if the added polymer coating develops a crack, this crack often initiates a crack in the adjacent telephone body. Thus, even though the telephone body itself might initially be more resistant to impact than the added polymer, its impact resistance after refurbishing is that of the coating polymer.

The properties of the coating polymer are also significant when recycling of the original telephone body is contemplated. When a telephone body has been damaged so that lacquering is not a suitable alternative, the plastic is usually salvaged by recycling. For telephones previously treated with a lacquer, the polymer coating will be incorporated into the recycled plastic. Often these incorporated coatings cause a degradation in the impact resistance of the basic polymer. This degradation phenomenon again is a substantial problem when the recycled plastic is employed in molded bodies, which are subject to frequent abuse.

Even if a polymer is found which does not degrade the impact properties of the treated plastic, it is often quite difficult to devise an acceptable lacquer based on this polymer. A lacquer, for commercial use, must satisfy certain prerequisites. For example, as discussed, the solid components of the lacquer, i.e., the component which ultimately remains on the coated body, must not degrade the properties of the coated plastic. The polymer must also disperse sufficient added pigment to yield sufficient hiding power for adequate coverage of the coated body. Typically, the hiding power of the lacquer increases linearly with the amount of pigment deposited. Since the pigment is dispersed through intermolecular interactions with the polymer solids portion of the lacquer, the amount of pigment deposited in turn depends on the concentration of the polymer in the solvent component of the lacquer. This interdependence of hiding power and solubility introduces a requisite of the solvent component of the lacquer. That is, the solvent component must be chosen so that, in view of the inherent hiding power of the solid component, sufficient polymer and thus pigment is dispersed to produce the desired opacity.

Besides satisfying the limits imposed by hiding power, the solvent component must also conform to pollution control standards. For example, California statutes strictly limit the solvents which may be used commercially. Such enviornmental considerations make lacquer formulation much more difficult.

The lacquer, as a combination of the individual solid and solvent components, also must have certain attributes. The viscosity must be sufficiently low to allow the lacquer to be easily sprayed and sufficiently high to prevent formation of runs on the coated surface. Additionally, the lacquer must evaporate at a rate which precludes webbing, and, the formation of an orange peel type of agglomeration surface. These defects typically occur when the solvent evaporates too rapidly.

The gloss of the coating and the permanence of the coating are also important properties. The lacquer must dry to a shiny finish which adheres to the coated surface. If a poorly formulated lacquer is used a low gloss or nonadherent coating is often the result.

The necessity for maintaining impact strength and the difficulties associated with lacquer formulation has retarded development of suitable lacquers for telephone refurbishing.

SUMMARY OF THE INVENTION

An ABS polymer (a terpolymer of butadiene, styrene and acrylonitrile) based lacquer has been formulated. The solvents used, a ketone of the formula

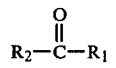

where $R_1$ is chosen from the group consisting of ethyl and propyl, and $R_2$ is a methyl group e.g., methyl ethyl ketone (MEK) and a second solvent constituent chosen from the group consisting of ethylene and glycol monoethyl ether acetate (EGMEA) ethylene diacetate, and ethylene glycol monomethyl ether acetate (EGMMA) sufficiently disperse the ABS polymer and in turn disperse sufficient pigment so that adequate hiding power is obtained. The solvents satisfy even the stringent pollution control requirements of California's Rule 66. Since ABS is the plastic used to form most telephones, no degradation of mechanical strength occurs when the subject ABS based lacquers are used for refurbishing.

When the ABS solids component is dispersed in a solvent component having a ketone, (e.g., MEK) to second solvent constituent e.g., EGMEA ratio in the range of 25/75 to 50/50 a high gloss coating which is free of webbing, sagging or agglomeration is obtained. The lacquer is easily sprayed and yields an adherent coating on ABS surfaces.

DETAILED DESCRIPTION

Lacquers are advantageously made by preparing a millbase and a letdown dispersion separately and then combining the two to form the lacquer. Both the millbase and letdown dispersion contain a portion of both the solid and solvent components of the lacquer. The millbase is formulated separately to expediently disperse any pigment or filler. The letdown dispersion is then added to complete the lacquer. The pigment must be ground to particle sizes less than 0.5 μm to consistently achieve dispersion. This grinding is necessarily done in a viscous media. In the preferred embodiment a millbase of suitable viscosity is formed by preparing a solution of between 15 to 30 percent ABS in a ketone,

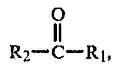

where $R_2$ is methyl and $R_1$ is chosen from the group consisting of ethyl and propyl. Sufficient ABS/ketone solution is used to suspend the pigment before grinding. For example, when 300 grams of titanium dioxide is used as a pigment 900 grams of 20 percent ABS in the ketone such as MEK is used to suspend the pigment. Once the pigment is initially suspended in the solution, the grinding is accomplished by conventional means such as by running the millbase on a ball mill. Milling is continued until the desired particle size, and thus dispersion of the pigment, is achieved.

After the millbase is prepared, the letdown dispersion, (which is simply the remaining components needed to produce the end lacquer), is prepared and combined with the millbase. When the millbase and letdown dispersion are prepared, they must be kept at room temperature. Excessive heating combined with rapid agitation to expedite dispersion of the ABS produces phase separation of the polymer and should be avoided.

The lacquer must be kept within specific compositional limits to avoid problems such as low gloss, webbing, sagging or agglomeration. The ratio of solvents in the final lacquer, i.e., the ratio of ketone such as MEK to second solvent constituent which chosen from the group consisting of EGMEA, EGMMA and ethylene diacetate should be in the range of 25/75 to 50/50 preferably 30/70 to 40/60. If less EGMEA is used during spraying, the solvent component evaporates before the lacquer reaches the surface to be coated. This premature drying produces webbing and other surface defects in the final lacquer coat. If the percentage of EGMEA exceeds the upper limit, the time required to dissolve the ABS solid component and the drying time of the lacquer become excessive. Replacement of a minor portion, i.e., less than 20 percent, of either the ketone such as MEK or the EGMEA with other solvents having similar vapor pressures and solvation for ABS is possible. (A convenient method of comparing the solvation power of one solvent for ABS with another is by comparing their solubility parameter, $\beta$. See P. Small, *Journal of Applied Chemistry,* 3, 71 (1953) and K. Hoy, *Journal Paint Technology,* 42, 76 (1970).) However, substitutes in greater quantities generally degrade lacquer properties.

The total solids content, i.e., polymer plus additives such as pigments and additional binders of the total lacquer composition should be in the range of 10–30 weight % preferably 20–25 weight %. When less than 10% total solids is used it is impractical to obtain adequate coatings. If greater amounts of total solids are utilized, the lacquer becomes too viscous for practical spraying operations.

The composition of the ABS plastic itself must also be controlled. If excessive polybutadiene is contained in the ABS, the lacquer coating shrinks from the treated body or yields a dull finish. Generally, the polybutadiene should comprise between 5 and 25 percent of the ABS polymer.

Once the lacquer is deposited onto a body by spraying or other conventional methods, the lacquer must be dried either by simply allowing the solvent to evaporate in the ambient or by employing means to speed evaporation. Thus, evaporation and drying occur at room temperature, but drying is expeditiously produced by heating. It is possible to utilize conventional heating means such as placing the lacquered surface in a forced air oven. Temperatures in the range 60 to 71 are conveniently employed. Lower temperatures require excessive heating times for large scale operations while higher temperatures cause decomposition or physical degradation of the coated polymer. The time periods expended for the heating process should be sufficient to completely evaporate the solvent component remaining in the coated layer. Typically, at temperatures in the preferred range, time periods of between 20 and 30 minutes are adequate.

The following example illustrates the preparation of the subject lacquers and a process for coating a plastic body with this lacquer.

EXAMPLE

The millbase pigment was prepared by first making a 20 percent ABS in MEK solution. This solution was made by placing 2000 grams of MEK in a 4 liter beaker. Five hundred grams of dried (4 hr at 71 degrees C.) ABS polymer (composition 80% by weight styrene acrylonitrile copolymer and 15% by weight polybutadiene and 5% additives) was added to the solvent and stirred for about 3.5 hours until complete dispersion was obtained. (Shorter dispersion times were attainable by adding a 5 percent excess of ABS and interrupting the mixing process before the polymer was totally dispersed.) The dispersions were filtered through a paint strainer. Three hundred grams of titanium dioxide was then ground in 900 grams of the 20 percent ABS in MEK dispersion. The titanium dioxide used to make this mixture was previously dried in a forced air oven at 150 degrees C. for a period of six hours. Grinding was achieved by placing the combined dispersion in a 5 liter crock which was in turn filled with a ceramic grinding media (porcelain ball 13 mm. in diameter) and which was placed on a large ball mill. The crock was turned at a rate of 300 rpm for 13 hours to yield an average pigment particle size of approximately 0.5 $\mu$m. The particle size was measured by using a Hegman gauge. (See ASTM *American Society for Testing Materials* D1210-27 for a description of the measuring procedure.)

The letdown dispersion was prepared by combining 270 grams of reagent grade EGMEA with 180 grams of reagent grade MEK and with 1350 grams of a 20 percent ABS solution in EGMEA. The 20 percent EGMEA solution was made by the same procedure as the 20 percent MEK dispersion except about 6 hours of stirring was required. The letdown dispersion was then added to the millbase and the resultant dispersion was ground an additional five minutes on the ball mill to insure pigment dispersion.

The specimens to be sprayed with this lacquer were washed in a dilute soap solution, rinsed with tap water, and then rinsed with distilled water. The specimens were then air dried for three hours at room temperature and for twelve hours at 71 degrees C. The lacquer was sprayed on the test specimens from a distance of approximately 8 to 10 inches with an air pressure of 50 psi. This spraying procedure yielded a film having a thickness of about 1 to 2 mils. The coated specimens were air dried at room temperatures for ten minutes and then oven dried for thirty minutes at 71 degrees C. This spraying produced a glossy finish which has free from surface defects. (The gloss of the coating was measured by the ASTM D 523 test for gloss and showed a value of 83.)

The impact resistance of the coated samples were tested by an unnotched Izod test and yielded a value of $29.8\pm0.20$ ft.-lb./in. as compared to a value of $30.8\pm0.40$ ft.-lb./in. for uncoated ABS plastic. The specimens were then melted at 170 degrees C. and remolded into $2\frac{1}{2}\times\frac{1}{2}\times\frac{1}{8}$ inch specimens. A notched Izod test was performed on these recycled specimens and a value of $4.93\pm0.24$ ft.-lb./in. as compared to a value of $4.94\pm0.24$ ft.-lb./in. for recycled uncoated ABS was obtained.

I claim:

1. A lacquer useful in coating plastic bodies comprising a solids component and a solvent component characterized in that said solvent component comprises a mixture having a ratio of ketone to a second solvent constituent in the rane 25/75 to 50/50 and having a solids component including a substantial portion of a terpolymer of butadiene, styrene, and acrylonitrile, said terpolymer having a polybutadiene content of between 5 and 25%, wherein said ketone is represented by the formula

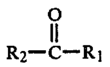

where $R_2$ is methyl and $R_1$ is an alkyl chosen from the group consisting of ethyl and propyl, wherein said second solvent constituent is chosen from the group consisting of ethylene glycol monoethyl ether acetate, ethylene glycol monomethyl ether acetate and ethylene diacetate, and wherein said solids component of said lacquer is in the range 10 to 30 weight percent.

2. The lacquer of claim 1 including a pigment in said solid component.

3. The lacquer of claim 1 wherein said pigment is titanium dioxide.

4. The lacquer of claim 1 wherein said ketone is methyl ethyl ketone.

5. The lacquer of claim 1 wherein the ratio of methyl ethyl ketone to said second solvent constituent is in the range of 30/70 to 40/60.

6. The lacquer of claim 1 wherein the weight percent of said solid component to said solvent component is in the range of 10 to 30.

7. A process for coating a body comprising the steps of coating a surface with a lacquer and drying the said lacquer characterized in that said lacquer comprises (1) said solvent component which contains (a) a ketone of the formula

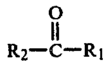

where $R_2$ is methyl and $R_1$ is an alkyl chosen from the group consisting of ethyl and propyl, and (b) is a second solvent constituent chosen from the group consisting of ethylene glycol monoethyl ether acetate ethylene glycol monomethyl ether acetate and ethylene diacetate in a ratio in the range of 25/75 to 50/50, and (2) a solids component which contains a substantial portion of a terpolymer of butadiene, styrene, and acrylonitrile, said terpolymer having a polybutadiene content of between 5 and 25%, wherein said solids component of said lacquer is in the range 10 to 30 weight percent.

8. The process of claim 7 wherein said ratio is in the range 30/70 to 40/60.

9. The process of claim 7 wherein said ketone is methyl ethyl ketone.

10. The process of claim 7 wherein said lacquer is dried by heating said coated surface by placing it in a environment having a temperature in the range 60 degrees C. to 71 degrees C.

11. The process of claim 7 wherein said body is substantially composed of a terpolymer of butadiene, styrene and acrylonitrile.

12. A product formed by the process of applying a lacquer to a plastic body said lacquer comprising a solvent component and a solids component wherein said solvent component comprises a mixture having a ratio of ketone to second solvent constituent in the range of 25/75 to 50/50 and having a solid component including a substantial portion of a terpolymer of butadiene, styrene, and acrylonitrile, said terpolymer having a polybutadiene content of between 5 and 25%, wherein said ketone is represented by the formula

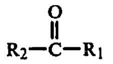

where $R_2$ is methyl and $R_1$ is an alkyl chosen from the group consisting of ethyl and propyl, and wherein said second solvent constituent is chosen from the group consisting of ethylene glycol monoethyl ether acetate, ethylene glycol monomethyl ether acetate, and ethylene diacetate, and wherein said solids component of said lacquer is in the range 10 to 30 weight percent.

13. The product of claim 11 wherein said ketone is methyl ethyl ketone.

* * * * *